United States Patent [19]

Liang

[11] Patent Number: 5,786,908

[45] Date of Patent: Jul. 28, 1998

[54] METHOD AND APPARATUS FOR CONVERTING IMAGE COLOR VALUES FROM A FIRST TO A SECOND COLOR SPACE

[75] Inventor: Tony Zhongjie Liang, Sewell, N.J.

[73] Assignee: E. I. du Pont de Nemours and Company, Wilmington, Del.

[21] Appl. No.: 406,906

[22] PCT Filed: Oct. 5, 1993

[86] PCT No.: PCT/US93/09286

§ 371 Date: Mar. 30, 1995

§ 102(e) Date: Mar. 30, 1995

[87] PCT Pub. No.: WO94/08274

PCT Pub. Date: Apr. 14, 1994

Related U.S. Application Data

[63] Continuation-in-part of Ser. No. 957,933, Oct. 7, 1992, abandoned, which is a continuation-in-part of Ser. No. 822,550, Jan. 15, 1992, abandoned.

[51] Int. Cl.$^6$ ................................ G03F 3/08; H04N 1/46
[52] U.S. Cl. ......................... 358/518; 358/522; 358/523; 358/524
[58] Field of Search ................. 358/518, 519, 358/520, 522, 523, 524, 530

[56] References Cited

U.S. PATENT DOCUMENTS

| | | | |
|---|---|---|---|
| 4,060,829 | 11/1977 | Sakamoto | 358/80 |
| 4,127,871 | 11/1978 | Sakamoto | 358/80 |
| 4,346,402 | 8/1982 | Pugsley | 358/80 |
| 4,409,614 | 10/1983 | Eichler et al. | 358/76 |
| 4,477,833 | 10/1984 | Clark et al. | 358/80 |
| 4,500,919 | 2/1985 | Schreiber | 358/78 |
| 4,843,379 | 6/1989 | Stansfield | 340/701 |
| 4,941,038 | 7/1990 | Walowit | 358/80 |
| 4,941,039 | 7/1990 | E'Errico | 358/80 |
| 4,958,220 | 9/1990 | Alessi et al. | 358/76 |
| 4,959,669 | 9/1990 | Haneda et al. | |
| 4,959,790 | 9/1990 | Morgan | 364/518 |
| 4,992,861 | 2/1991 | D'Errico | 358/75 |
| 5,111,286 | 5/1992 | MacDonald et al. | 358/75 |
| 5,149,960 | 9/1992 | Dunne et al. | 250/226 |
| 5,185,661 | 2/1993 | Ng | 358/75 |
| 5,200,817 | 4/1993 | Birnbaum | 358/80 |
| 5,200,832 | 4/1993 | Taniuchi et al. | 358/300 |

FOREIGN PATENT DOCUMENTS

| | | | |
|---|---|---|---|
| 0 173 032 A2 | 3/1986 | European Pat. Off. | H04N 1/46 |
| 0 378 448 A2 | 7/1990 | European Pat. Off. | H04N 1/46 |
| 0 528 094 A1 | 2/1993 | European Pat. Off. | H04N 1/46 |

OTHER PUBLICATIONS

Xerox; "Color Encoding Standard" 1989/91.
McManus; Method for Matching Hardcopy Color to Display Color SID 85 Digest.
Accurate Color Reproduction for Computer Graphics; Lindbloom; Computer Graphics, vol. 23 #3, 1989 pp. 117–124.
Color Reproduction Theory Based on Principles of Color Science; Laihanen; pp. 1–33.
Tektronix; Background Information PostScript Level Eastman Kodak.

(List continued on next page.)

*Primary Examiner*—Leo Boudreau
*Assistant Examiner*—Jerome Grant, II
*Attorney, Agent, or Firm*—Thomas H. Magee

[57] ABSTRACT

The present invention relates to a method and apparatus for converting and for matching color values between color spaces. The invention comprises a source device (16) for generating image signals; a color space converter (11), including a receiving and determining means (10), an interpolating means (14), and a regular primary look-up-table (LUT) (12), for converting the received image signals into second space color values; an outputting means (18) for supplying the second color values to a peripheral device (20).

14 Claims, 6 Drawing Sheets

OTHER PUBLICATIONS

Eastman Kodak; Device Dependent Color Rendition pp. 1–15, 44 & 46.

ColorGamut Mapping and the Printing of Digital Color Images; Stone; Apr. 1988 pp. 1–52.

Color Gamut Mapping and the Printing of Digital Color Images; Stone; ACM Trans. on Graph. vol. 7 No. 4 Oct. 1988 pp. 249–292.

P. Kubelka, New Contributions to the Optics of Intensely Light–Scattering Materials. Part I. Journal of the Optical Society of America, vol. 38, No. 5, pp. 448–457, May, 1948.

W. L. Rhodes, Proposal for an Empirical Approach to Color Reproduction, *Color Research and Application*, vol. 3, No. 4, pp. 197–201, Winter 1978.

H.E.J. Neugebauer, Unsolved Problems of Color Reproduction. *Technical Association of the Graphic Arts*, Tenth Annual Meeting, pp. 45–56, Jun. 23–26, 1958.

D. L. Spooner, Digital Simulation of Prepress Proofing Systems, *Neugebauer Memorial Seminar on Color Reproduction*, SPIE vol. 1184, pp. 131–136, Dec. 14–15, 1989.

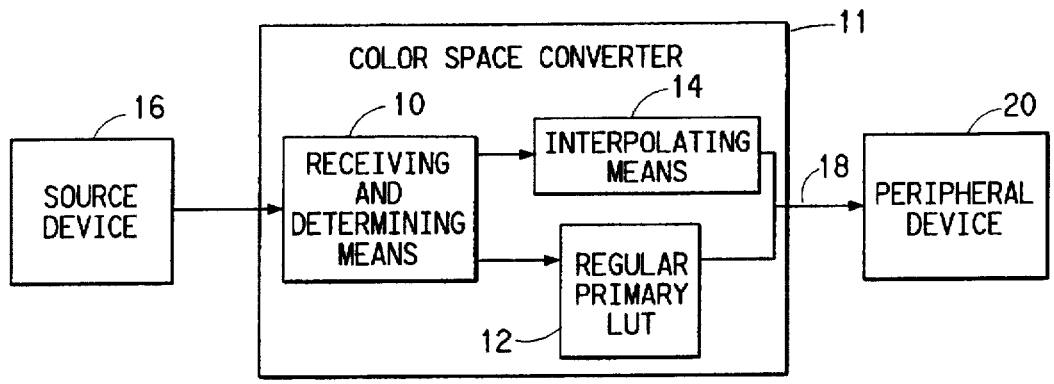
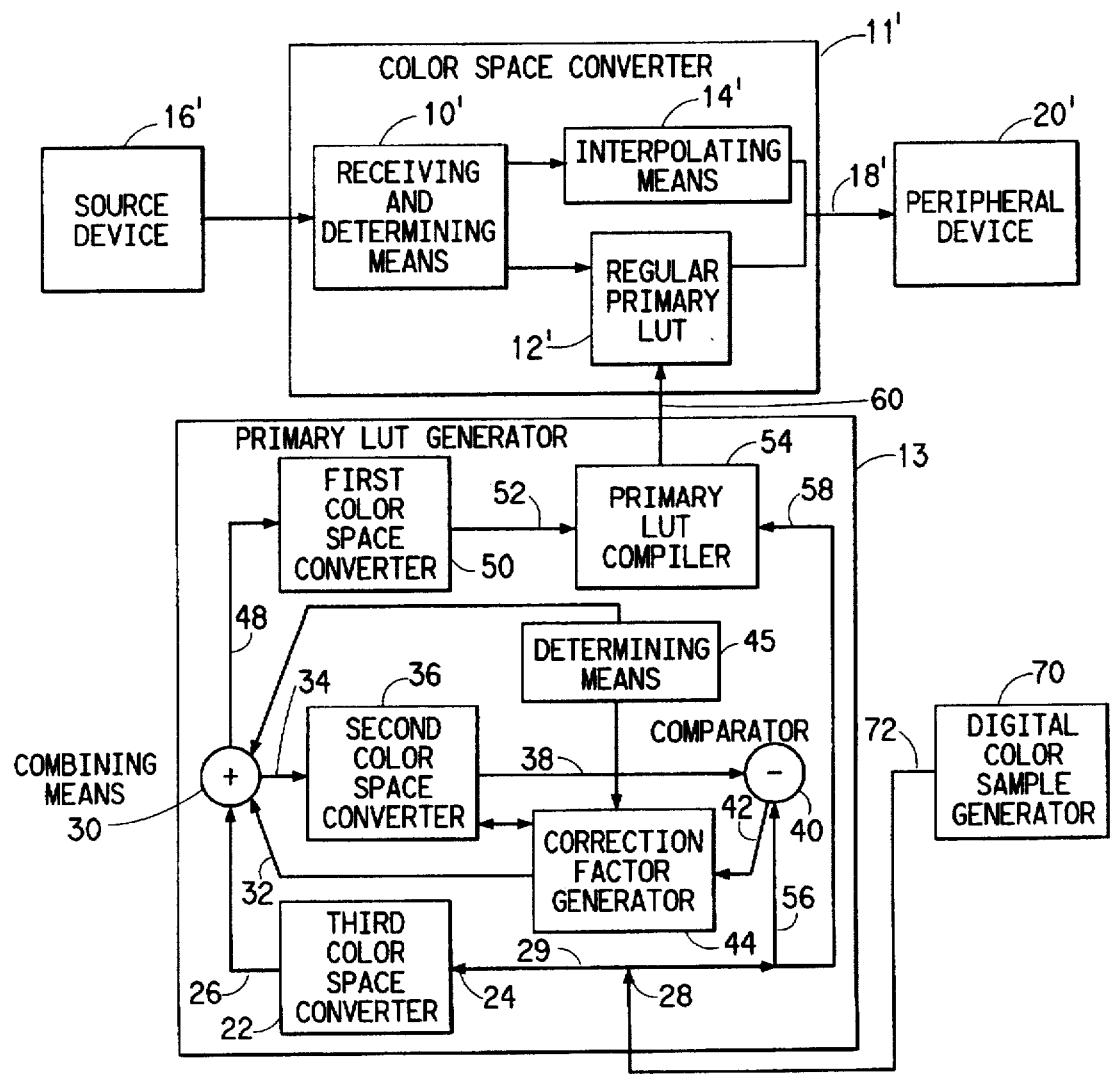

METHOD AND APPARATUS FOR CONVERTING IMAGE COLOR VALUES FROM A FIRST TO A SECOND COLOR SPACE

CROSS REFERENCES TO RELATED APPLICATIONS

This is a continuation-in-part application of copending U.S. patent application Ser. No. 07/957,933 filed Oct. 7, 1992, now abandoned, which is a continuation-in-part application of copending U.S. patent application Ser. No. 07/822,550 filed Jan. 15, 1992, abandoned.

BACKGROUND OF THE INVENTION

1. Field of the Invention

This invention relates to color matching and, more particularly, to a process and related apparatus for converting color values between color spaces.

2. Description of Related Art

The primary use of this invention is in the field of computer assisted color publishing systems particularly in the area of color matching and color reproduction. In such systems typically a color image is scanned using a scanning device which measures light intensity reflected or transmitted from the image to generate electronic signals representing three achromatic images of the original, each of the three achromatic images resulting from detecting the light intensity from the original color image through a colored filter. The filters used are almost always Red Green and Blue. The electronic signal from the scanner is converted to a digital signal in which light intensity levels are represented as numbers. Information identifying each set of numbers representing the image information obtained through each filter is also preserved. Thus, the original colored image has been converted to a plurality of image values, and for each picture element in the picture there is a color value comprising the achromatic component values, i.e., a Red, a Green and a Blue value.

The output of the scanner is eventually used to drive a film exposing device to produce color separation transparencies that are used to make printing plates which in turn are used on a press to supply a printed copy. For purposes of this invention we will refer to this device as a printer and will assume that such printer may be the combination of elements including the color separation transparencies, the plates and the press, or a device such as a color laser printer which may produce a color image without need for a separate printing plate, or any other device which is able to receive an electronic signal representing amounts of inks of given color needed to be printed for each picture element to produce a color image output. Typically such signals are identified as YMCK for the usual four color reproduction situation, each letter corresponding to each of the four inks used, namely Yellow, Magenta, Cyan and Black. Thus, "printer" within this invention includes any device that receives an electronic signal and displays therefrom a colored image.

Scanners are manufactured by a number of manufacturers, each using a particular set of Red, Green and Blue filters. Furthermore, the manufacturers of printers each have their own manner of interpreting the color information at the printer input and applying the proper amount of ink on the paper or colorant in the display.

As anyone who has attempted to describe color knows, such description is complicated by the fact that color perception varies with both the surrounding colors and the illumination used to view an image. Colorimetry, which is the study of color based on both spectral distribution of the energy reflected or transmitted from a test sample and the response of the human eye, as well as the spectral distribution of the illuminating source, provides us with a method to describe and measure color and enables us to determine when colors match. CIE (the International Commission on Illumination) defines Tristimulus values as the amounts of three primary lights which when added produce a visual, or calorimetric, match with an original color. These CIE Tristimulus values can be used for color description and matching purposes. If two colors have the same three CIE Tristimulus values that is if the Red Tristimulus value of one color is the same as the Red Tristimulus value of the other, and so on for the Green and Blue Tristimulus values, then the appearance of the two colors will be the same to the average observer.

Thus, the Tristimulus values are device independent color values.

It would, thus, appear that if one wanted to match colors between input and output using devices from different manufacturers, one would simply need a conversion device to convert the Red, Green and Blue output values of a scanner to a set of values that is device independent, such as the CIE Tristimulus Values. Such conversion device would perform a colorimetric characterization on the scanner output to derive the appropriate device independent values.

Similarly, it would appear that a similar colorimetric characterization performing conversion device can be constructed providing a conversion for the set of device independent values, to printer device dependent values such as a particular printer's RGB or YMCK input needs.

While the solution appears simple, creating such conversion devices is very difficult. The difficulty lies primarily in establishing a valid and predictable relationship between the values from each device dependent color space and the device independent color space values.

Most color matching techniques used primarily in the printing and publishing industry attempt to match colors by optimizing a set of coefficients used in the color transformation formula such that the error between the targeted color and the processed color is minimized.

The differences between the various methods reside in the specific transformation models. These transformation models are either physical, based on the physical properties of a particular system or process such as described by P. Kubelka, "New contributions to the optics of intensely light scattering materials" part i, J. Opt. Soc. Am. 38, pp. 448–457, or are mathematical models using linear or other polynomial approximations, such as described in U.S. Pat. No. 4,500,919 by Schreiber or U.S. Pat. No. 4,959,790 by F. P. Morgan.

U.S. Pat. 4,500,919 provides one solution to this problem of color matching by essentially proposing a system that produces device independent RGB values. Additionally, U.S. Pat. No. 4,409,614 shows another way to calculate the appropriate relationship between device dependent values and device independent ones. Both processes appear complex and the results are based on subjective criteria. Furthermore, both processes are limited when high quality color matching is desired because their accuracy is limited.

Thus, there is still need for a method and associated apparatus to enable the creation of a practical color image value conversion apparatus which will permit one to obtain accurate image value conversions.

SUMMARY OF THE INVENTION

The present invention relates to a method for matching colors, comprising:

I) converting a first plurality of color image values from a first color space to a second plurality of color values in a second color space, wherein the first color space is a device dependent color space and the second color space is a device independent color space, by:

generating a primary regular conversion LUT correlating preselected regularly distributed color values in said first color space to color values in said second color space by:
1) generating a predetermined regular set of intermediate values representing a set of color patches;
2) printing said set of color patches;
3) measuring each of said printed patches and generating for each of said printed patches color values in said independent color space;
4) producing a first color space converter comprising a first LUT cross-referencing the predetermined regular set of intermediate color values representing the set of color patches, and the measured color values in said device independent color space representing the printed set of color patches, and a first interpolation algorithm for calculating Intermediate values not represented by any printed patches to color values in said device independent color space;
5) reading said printed set of color patches with a device of the type which produces color values in the device dependent color space, and producing for each of said printed patches device dependent color values in said device dependent color space;
6) generating a second color space converter comprising a second LUT cross-referencing the predetermined regular set of Intermediate values representing the set of color patches and color values in the device dependent color space, and a second interpolation algorithm for calculating Intermediate values not represented by any printed patches to the device dependent color values;
7) generating a third color space converter comprising a third LUT approximately cross-referencing the device dependent values and the Intermediate values;
8) generating a set of predetermined, regularly distributed, digital device dependent sample color values;
9) applying the third color space converter to said sample color values to obtain a corresponding set of sample Intermediate values;
10) applying the second color space converter to the sample Intermediate values to obtain a new set of device dependent sample color values corresponding to the digital device dependent sample color values;
11) comparing said regularly distributed device dependent digital sample color values and said new set of device dependent sample color values to obtain an error signal and using this error signal to derive a correction factor;
12) combining the correction factor with the output of the third color space converter and again applying the second color space converter to the resulting corrected output of the third color space converter;
13) repeating steps 11) and 12) until the error signal is a minimum;
14) applying the first color space converter to the corrected signal to produce an output device independent value for each regular digital device dependent sample color value; and
15) creating the primary LUT correlating the device independent values from the output of the first color space converter and the set of predetermined, regularly distributed, digital device dependent sample color values;

inputting and comparing randomly distributed image color values in said first color space to the values in said primary LUT; and
(a) if there is a regularly distributed color value in the primary LUT corresponding to the random color value, outputting a corresponding value in said second color space; and
(b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) using the outputted values from steps (a) and (b) to produce an image on a peripheral device.

The invention further relates to a method for matching colors, comprising:

I) converting a first plurality of color image values from a first color space to a second plurality of color values in a second color space, wherein the first color space is a device independent color space and the second color space is a device dependent color space, by:

generating a primary regular conversion LUT correlating preselected regularly distributed color values in said first color space to color values in said second color space by:
1) using a peripheral device to print a predetermined set of regularly distributed color patches using a regularly distributed set of device dependent color values;
2) measuring each of said printed patches and generating for each of said printed patches color values in said device independent color space;
3) using the measured values and the corresponding set of device dependent regularly distributed values to generate a first LUT correlating device dependent values to device independent values;
4) using the same measured device independent values and device dependent regularly distributed values to generate an approximate inverse LUT correlating device independent values to device dependent values;
5) generating a set of regularly distributed digital color sample values in the device independent color space and converting said color sample values to device dependent color values using the approximate inverse LUT;
6) combining the converted sample color values with correction factors to obtain corrected converted color values;
7) converting said corrected color values using a first color space converter which includes said first LUT correlating device dependent values to device independent values, to obtain an output;
8) comparing the output to the digital sample values input to obtain an error signal;

9) using the error signal to generate the correction factors;
10) repeating steps 6) through 9) until the error signal is a minimum; and
11) using the corrected values and the set of regularly distributed digital color sample values to create the regular primary LUT;

inputting and comparing randomly distributed image color values in said first color space to the values in said primary LUT; and
   (a) if there is a regularly distributed color value in the primary LUT corresponding to the random color value, outputting a corresponding value in said second color space; and
   (b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) using the outputted values from steps (a) and (b) to produce an image on the peripheral device.

The invention is also related to a method for matching colors in an image received from a source device and displayed on a peripherial device, comprising:

I) converting a first plurality of color image values from a first color space to a second plurality of color values in a second color space, wherein the first color space is a device dependent color space and the second color space is a device independent color space, by:
  generating a first primary regular conversion LUT correlating preselected regularly distributed color values in said first color space to color values in said second color space by:
   1) generating a predetermined regular set of intermediate values representing a set of color patches;
   2) printing said set of color patches;
   3) measuring each of said printed patches and generating for each of said printed patches color values in said independent color space;
   4) producing a first color space converter comprising a first LUT cross-referencing the predetermined regular set of intermediate color values representing the set of color patches, and the measured color values in said device independent color space representing the printed set of color patches, and a first interpolation algorithm for calculating Intermediate values not represented by any printed patches to color values in said device independent color space;
   5) reading said printed set of color patches with a device of the type which produces color values in the device dependent color space, and producing for each of said printed patches device dependent color values in said device dependent color space;
   6) generating a second color space converter comprising a second LUT cross-referencing the predetermined regular set of Intermediate values representing the set of color patches and color values in the device dependent color space, and a second interpolation algorithm for calculating Intermediate values not represented by any printed patches to the device dependent color values;
   7) generating a third color space converter comprising a third LUT approximately cross-referencing the device dependent values and the Intermediate values;
   8) generating a set of predetermined, regularly distributed, digital device dependent sample color values;
   9) applying the third color space converter to said sample color values to obtain a corresponding set of sample Intermediate values;
   10) applying the second color space converter to the sample Intermediate values to obtain a new set of device dependent sample color values corresponding to the digital device dependent sample color values;
   11) comparing said regularly distributed device dependent digital sample color values and said new set of device dependent sample color values to obtain an error signal and using this error signal to derive a correction factor;
   12) combining the correction factor with the output of the third color space converter and again applying the second color space converter to the resulting corrected output of the third color space converter;
   13) repeating steps 11) and 12) until the error signal is a minimum;
   14) applying the first color space converter to the corrected signal to produce an output device independent value for each regular digital device dependent sample color value; and
   15) creating the primary LUT correlating the device independent values from the output of the first color space converter and the set of predetermined, regularly distributed, digital device dependent sample color values;

inputting and comparing randomly distributed image color values in said first color space from the source device to the values in said primary LUT; and
   (a) if there is a regularly distributed color value in the primary LUT corresponding to the random color value, outputting a corresponding value in said second color space; and
   (b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) converting the outputted values from steps (a) and (b) from the second color space to a third plurality of color values in a third color space, wherein the third color space is a device dependent color space, by:
  generating a second primary regular conversion LUT correlating preselected regularly distributed color values in said second color space to color values in said third color space by:
   1) using the peripheral device to print a predetermined set of regularly distributed color patches using a regularly distributed set of device dependent color values;
   2) measuring each of said printed patches and generating for each of said printed patches color values in said device independent color space;
   3) using the measured values and the corresponding set of device dependent regularly distributed values to generate a first LUT correlating device dependent values to device independent values;
   4) using the same measured device independent values and device dependent regularly distributed values to generate an approximate inverse LUT correlating device independent values to device dependent values;

5) generating a set of regularly distributed digital color sample values in the device independent color space and converting said color sample values to device dependent color values using the approximate inverse LUT;

6) combining the converted sample color values with correction factors to obtain corrected converted color values;

7) converting said corrected color values using a first color space converter which includes said first LUT correlating device dependent values to device independent values, to obtain an output;

8) comparing the output to the digital sample values input to obtain an error signal;

9) using the error signal to generate the correction factors;

10) repeating steps II) 6) through II) 9) until the error signal is a minimum; and 11) using the corrected values and the set of regularly distributed digital color sample values to create the second regular primary LUT;

inputting and comparing the outputted values from steps (a) and (b) from the second color space to the values in said second primary LUT; and (i) if there is a regularly distributed color value in the second primary LUT corresponding to the outputted value, outputting a corresponding value in said third color space; and (ii) if there is no corresponding regularly distributed color value in said second primary LUT, selecting from said second primary LUT a closest regularly distributed color value to said outputted value and calculating therefrom a color value in said third color space, corresponding to said outputted value, and outputting said calculated value; and III) using the outputted values from steps (i) and (ii) to produce an image on the peripheral device.

The invention further relates to a method for matching colors in an image received from a source device and displayed on a peripherial device, comprising:

I) converting a first plurality of color image values from a first color space to a second plurality of color values in a second color space, wherein the first color space is a device dependent color space and the second color space is a device independent color space, by:

generating a first primary regular conversion LUT correlating preselected regularly distributed color values in said first color space to color values in said second color space by:

1) generating a predetermined regular set of intermediate values representing a set of color patches;

2) printing said set of color patches;

3) measuring each of said printed patches and generating for each of said printed patches color values in said independent color space;

4) producing a first color space converter comprising a first LUT cross-referencing the predetermined regular set of intermediate color values representing the set of color patches, and the measured color values in said device independent color space representing the printed set of color patches, and a first interpolation algorithm for calculating Intermediate values not represented by any printed patches to color values in said device independent color space;

5) reading said printed set of color patches with a device of the type which produces color values in the device dependent color space, and producing for each of said printed patches device dependent color values in said device dependent color space;

6) generating a second color space converter comprising a second LUT cross-referencing the predetermined regular set of Intermediate values representing the set of color patches and color values in the device dependent color space, and a second interpolation algorithm for calculating Intermediate values not represented by any printed patches to the device dependent color values;

7) generating a third color space converter comprising a third LUT approximately cross-referencing the device dependent values and the Intermediate values;

8) generating a set of predetermined, regularly distributed, digital device dependent sample color values;

9) applying the third color space converter to said sample color values to obtain a corresponding set of sample Intermediate values;

10) applying the second color space converter to the sample Intermediate values to obtain a new set of device dependent sample color values corresponding to the digital device dependent sample color values;

11) comparing said regularly distributed device dependent digital sample color values and said new set of device dependent sample color values to obtain an error signal and using this error signal to derive a correction factor;

12) combining the correction factor with the output of the third color space converter and again applying the second color space converter to the resulting corrected output of the third color space converter;

13) repeating steps 11) and 12) until the error signal is a minimum;

14) applying the first color space converter to the corrected signal to produce an output device independent value for each regular digital device dependent sample color value; and 15) creating the primary LUT correlating the device independent values from the output of the first color space converter and the set of predetermined, regularly distributed, digital device dependent sample color values;

inputting and comparing randomly distributed image color values in said first color space from the source device to the values in said primary LUT; and (a) if there is a regularly distributed color value in the primary LUT corresponding to the random color value, outputting a corresponding value in said second color space; and (b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) converting the outputted values from steps (a) and (b) from the second color space to a third plurality of color values in a third color space, wherein the third color space is a device dependent color space, by:

generating a second primary regular conversion LUT correlating preselected regularly distributed color values in said second color space to color values in said third color space by:

1) using the peripheral device to print a predetermined set of regularly distributed color patches using a regularly distributed set of device dependent color values;
2) measuring each of said printed patches and generating for each of said printed patches color values in said device independent color space;
3) using the measured values and the corresponding set of device dependent regularly distributed values to generate a first LUT correlating device dependent values to device independent values;
4) using the same measured device independent values and device dependent regularly distributed values to generate an approximate inverse LUT correlating device independent values to device dependent values;
5) generating a set of regularly distributed digital color sample values in the device independent color space and converting said color sample values to device dependent color values using the approximate inverse LUT;
6) combining the converted sample color values with correction factors to obtain corrected converted color values;
7) converting said corrected color values using a first color space converter which includes said first LUT correlating device dependent values to device independent values, to obtain an output;
8) comparing the output to the digital sample values input to obtain an error signal;
9) using the error signal to generate the correction factors;
10) repeating steps II) 6) through II) 9) until the error signal is a minimum; and
11) using the corrected values and the set of regularly distributed digital color sample values to create the second regular primary LUT;

inputting and comparing the outputted values from steps (a) and (b) from the second color space to the values in said second primary LUT; and (i) if there is a regularly distributed color value in the second primary LUT corresponding to the outputted value, outputting a corresponding value in said third color space; and
(ii) if there is no corresponding regularly distributed color value in said second primary LUT, selecting from said second primary LUT a closest regularly distributed color value to said outputted value and calculating therefrom a color value in said third color space, corresponding to said outputted value, and outputting said calculated value; and III) using the first and second primary LUTs to create a direct transform LUT correlating first and third device dependent color values;

IV) inputting and comparing randomly distributed image color values in said first color space from the source device to the values in said direct transform LUT; and
(a) if there is a regularly distributed color value in the direct transform LUT corresponding to the random color value, outputting a corresponding value in said third color space; and
(b) if there is no corresponding regularly distributed color value in said direct transform LUT, selecting from said direct transform LUT a closest regularly distributed color value to said randomly distributed color value and calculating therefrom a color value in said third color space, corresponding to said inputted random color value, and outputting said calculated value; and V) using the outputted values from steps IV) (a) and IV) (b) to produce an image on the peripheral device.

The invention is further directed to apparatus for performing these methods.

BRIEF DESCRIPTION OF THE DRAWINGS

The invention will next be described with reference to the accompanying drawings which are provided by way of illustration and are not limiting, and in which:

FIG. 1 is a schematic representation of an apparatus for implementing the present invention.

FIG. 2 is a schematic representation of an apparatus for implementing the present invention showing means associated with a color space converter for generating a primary Look-up Table LUT in the case where the conversion is from a device dependent color space to a device independent one.

DESCRIPTION OF THE PREFERRED EMBODIMENT(S)

Figure 3:
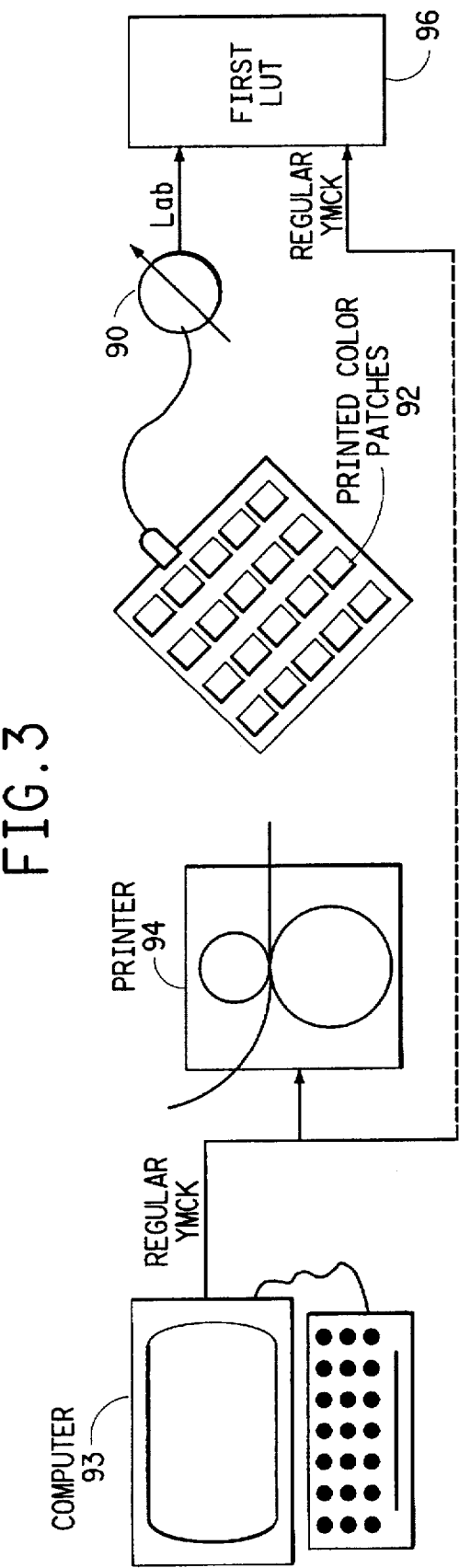
FIG. 3 is a schematic representation of the apparatus needed to generate a LUT correlating a regular list of predetermined intermediate color image values to device independent color image values.

Throughout the following detailed description, similar reference characters refer to similar elements in all figures of the drawings.

With reference to FIG. 1, there is contemplated under this invention an apparatus for the conversion of color image values derived in one, first, arbitrary, color space to color image values in a different, second, also arbitrary, color space. Thus, for instance, color image values generated by a device outputting RGB values for each element of a colored picture scanned by said device, may be converted to corresponding image values in a CIE defined color space such as Lab, Luv, XYZ and the like. In the alternative, given a plurality of color image values in a color space such as Luv, Lab or XYZ, the apparatus may convert them to a plurality of values in a colored space defined by a device such as a printer operating in the usual YMCK printing ink environment, or a television display employing the RGB color phosphor based system.

In any of these cases, image signals having a random value distribution are received from a source device 16, which may be a scanner, or an image work processing station, or a computer, or any other source of such image representing color values in a color space converting module 11. The module or converter 11 comprises a receiving means 10, a primary look-up-table (LUT) 12 for converting first color space color values to values representing color vectors in the second color space, and an interpolator 14. The receiving means 10 examines each incoming color value, that is, the incoming color vector, describing the color of each picture element in the color space used by the source device 16, (the first color space), to determine if there exists an exact match for this value in the primary LUT 12. Both the interpolator 14 and primary LUT 12 are accessible by the receiving means 10. The output of both the interpolator 14 and the LUT 12 is directed to an outputting means 18 which supplies this output to a peripheral device 20.

The color space may or may not be a uniform color space. It may be a color space defined by CIE or one related to a CIE defined space through a mathematical transformation.

The primary LUT 12 is comprised of a regular distribution of color values in the first color space giving corresponding color values in the second space. Both spaces are predetermined. A regular distribution is one in which the interval for the values along each coordinate is fixed (even though the interval may vary along the coordinates) and there is a limited predetermined number of values present representing a defined grid of discrete color values. For example, in a two coordinate system X and Y with two intervals in X, i.e., X=0 and X=3 and with three intervals in Y, i.e., Y=0, Y=2 and Y=5, the regular distribution of values will be: (X,Y)→(0,0), (0,2), (0,5), (3,0), (3,2), and (3,5). Preferably, the spacing of the values selected is such that intermediate points are interpolated from the selected values with a reasonable degree of accuracy using multi-linear interpolation. That is, the spacings are selected close enough at all regions of the selected color space and the conversions for the grid points are so accurate that one may assume, for practical purposes, that between grid points the color changes are substantially linear. Viewed in a different manner one may say that the grid points are selected close enough and such that the color space between grid points is substantially uniform.

In operation as each image pixel color value is received by the receiving means 10, it is compared to the values in the primary LUT 12. If a corresponding value exists, the corresponding value is supplied as the output of the color space converter 11 to the peripheral device 20 for further processing. If there is no corresponding value in the primary LUT 12 matching the input color value, the receiving means 10 determines which is the closest corresponding color value in the primary LUT 12 and provides this information to the interpolator 14 to obtain an interpolated corresponding value in the second color space which is outputted to the peripheral device 20. The interpolation performed preferably comprises a linear multidimensional interpolation.

Associated with this color space converter 11, there is typically apparatus for generating the primary LUT 12. This apparatus will be somewhat different depending on the nature of the color space conversion contemplated, that is whether the conversion will be from a device dependent color space to a device independent color space, i.e., from a scanner RGB density value output to a device independent CIE uniform color space, such as, used extensively in the publishing business, i.e., Lab, or whether the conversion is from a Lab space to the typical YMCK printer dependent values used by the printers to produce color image prints. It should be noted at this time that the specific color spaces employed are given by way of illustration rather than limitation and in cases where the printer is one which operates using RGB values, RGB rather than YMCK values will be the ultimate product of the color space converter 11 and so on.

FIG. 2 illustrates apparatus 13 for generating the primary LUT 12 of FIG. 1 in cases where the first color space is a device dependent color space and the second color space is a device independent color space. The apparatus for generating the primary LUT 12 (or 12') may be integral with the color space converter 11 or (11'), or may be separate. The output of this primary LUT generating apparatus 13 is the primary LUT 12' which is subsequently used in the color converter 11'.

The primary LUT generating apparatus 13 comprises means to receive 28, for receiving a set of digital, device dependent sample color values. The means to receive 28 the digital color values supplies these values to a third color space converter 22 having an input 24, to a comparator 40 and to a primary LUT compiler 54 over lines 29, 56 and 58, respectively.

The output of the third color space converter 22 is directed over line 26 to a combining means 30. The combining means 30 is also connected to the output of a correction factor generator 44 and combines the correction factor generator output with the output from the third color space converter 22 to produce a signal which is fed over line 34 to a second color space converter 36.

The output of the second color space converter 36 is directed over line 38 to comparator 40 where it is compared with the signal representing the input digital sample color values to produce an error signal. This error signal is then directed over line 42 to the correction factor generator 44 where it is used to produce an output representing a correction factor.

Means 45 to determine when the correction factor is an optimum correction factor are also included which sense the error signal and operate on the error signal in the correction factor generator 44 to generate the correction factor. Details of a preferred embodiment for determining an optimum correction factor will be given below.

The determining means 45 are also associated with the combining means 30 for applying over line 48 the output of the combining means 30 to a first color space converter 50, when the correction factor has been optimized.

The output of this first color space converter 50 is used in the primary LUT compiler means 54 together with the input digital device dependent sample color values to compile the primary LUT 12'. The compiler output is then provided to the color space converter 11' over line 60.

The apparatus up to this point has been described in terms of hardware having specific functions. However, it is within the scope of this invention to implement this invention using either dedicated hardware performing functions equivalent to those hereinabove described, or to use a programmed computer to implement any or all of the above functions through appropriate algorithms. This is particularly convenient since large memories are readily available and the signals representing image color value data are usually digital signals particularly well suited for computer manipulation.

Figure 5:
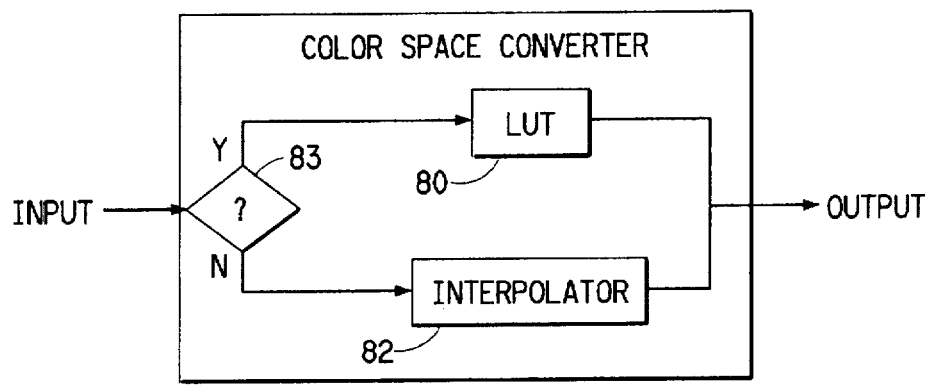
FIG. 5 is a schematic representation of a color space converter comprising a LUT and an interpolator.

Looking now at the various modules that comprise this apparatus in more detail, FIG. 5 represents a color space converter of the type used for both the first and second color converters 50 and 36, respectively. These converters 50, 36 are fundamentally the same as the color space converter 11 using a LUT 80, an interpolator 82, and a receiving and determining means 83 which interrogates received input values to determine if such values are listed in the LUT 80 and, if not, supplies the received values to the interpolator 82 for interpolation of a corresponding value. The (first) LUT 80 in the first color space converter 50 correlates a regular set of color values from an intermediate preselected color space to corresponding color values in a device independent color space. The (second) LUT 80 in the second color space converter 36 correlates the same intermediate color space values to color values in a device dependent color space.

The third color space converter 22 comprises a third, inverse LUT approximately correlating device dependent color values to the selected intermediate color space color values.

The first LUT 50 which is used to convert intermediate color space values to device independent color space values comprises a list of regularly distributed intermediate values, and is constructed as follows. A set of regularly distributed color values, representing values in a preselected color space, is outputted from a device, such as a computer 93 shown in FIG. 3, able to generate digital values. The preselected space may be any convenient space of our choosing, the choice depending primarily on the equipment available to proceed with the next steps. What is needed is some means to generate from this list of regularly distributed digital values, color patches for measurement. The equipment selected to generate the color patches should preferably have as large a color gamut as possible.

If a printer 94 whose input is in CYMK space is available then preferably the intermediate space selected will be the CYMK space of the printer 94, and the values outputted by the computer 93 are printed using such printer 94 to produce a set of printed color patches 92 representing a reasonable finite number. As an example, the following may be such a list.

| LIST 1 |
| --- |
| Y: 0, 13, 26, 51, 76, 102, 128, 153, 178, 204, 230, 255. |
| M: 0, 13, 26, 51, 76, 102, 128, 153, 178, 204, 230, 255. |
| C: 0, 13, 26, 51, 76, 102, 128, 153, 178, 204, 230, 255. |
| K: 0, 13, 26, 51, 89, 128, 178, 255. |

As shown schematically in FIG. 3, color patches 92 for all of the above values are printed, a total of 13,824 sample patches, using the printer 94. These patches 92 are then measured using a device 90 giving its output in the device independent color space selected. This color space is preferably a uniform color space, such as Lab, and the device used is a colorimetric measuring device.

A first LUT 96 is next compiled using the values outputted by the computer 93 and the corresponding values read by the measuring device 90 from the printed patches 92, forming the first LUT 96 which in this example correlates exactly CYMK values to Lab values for a set of patches 92 printed with the particular printer 94. The particular printer 94 is not significant since the relationship is only used as an intermediate step and the final primary LUT 12' is created independently of the particular printer used color reproduction particularities.

Figure 4:
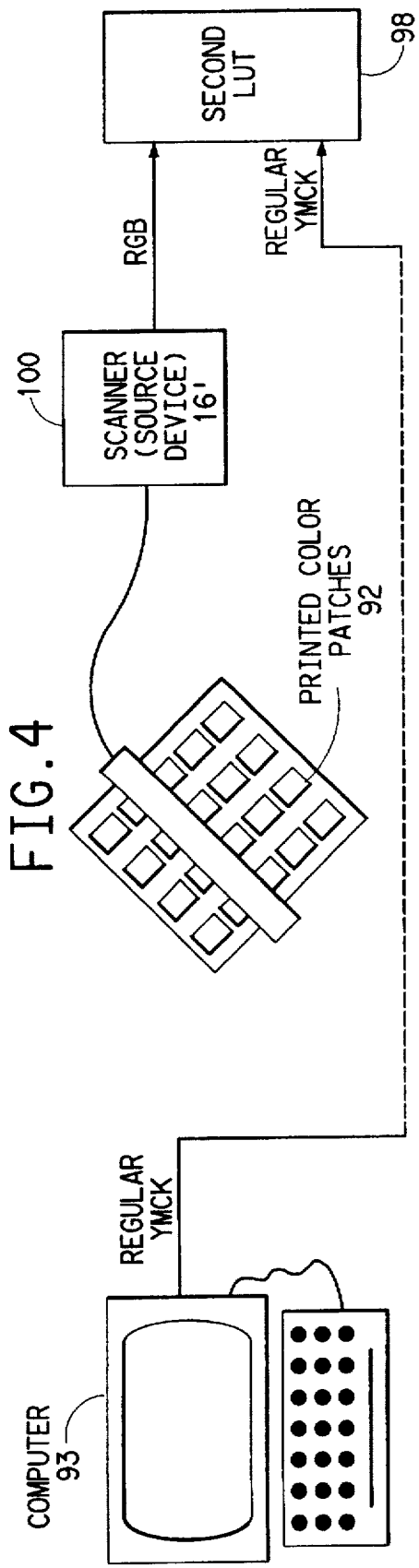
FIG. 4 is a schematic representation of an apparatus for generating a LUT correlating the regular predetermined intermediate color values to device dependent color values.

Referring to FIG. 4, the printed set of color patches 92 is also read using a device 100 having an output in the same color space as the device color space for which the color space converter 36 and associated primary LUT 12' are desired. Preferably, a similar scanner, as the one to be used later is employed and its output, let us say for example, a set of device dependent RGB values is used to compile a second LUT 98. This second LUT 98 functions as the LUT 80 in the second color converter 36 and gives an exact relationship between the intermediate computer generated values used to print the set of patches 92 and corresponding device dependent values. Thus, we now have two LUTs 96 and 98, one LUT 96 in our example correlating a set of YMCK color values to a set of Lab values and a second LUT 98 correlating the same set of YMCK values to device dependent RGB values. Of course what is needed is a LUT 12' accurately correlating a set of regularly distributed device dependent, i.e., RGB values, to device independent, i.e., Lab, values.

Using the information from the second LUT 98 we can create an approximate LUT which is the inverse of the second LUT 98 giving the third, approximate inverse LUT correlating device dependent, RGB in this example, values to intermediate space values. The specific manner in which this inverse LUT is generated starting from the forward LUT 98 is as follows.

It is desired to go from the LUT 98 correlating regularly distributed YMCK values to RGB to a LUT correlating regularly distributed RGB values to YMCK. Because this conversion LUT will be used to only provide intermediate space values which are simply the initial input in an optimization process that corrects for conversion error, the accuracy of the initial estimated YMCK values is not critical.

Having obtained the YMCK to RGB, forward, LUT 98 we generate an inverse LUT of RGB to YMCK by inspecting the forward table; for instance:

| Forward LUT | | | | | | |
| --- | --- | --- | --- | --- | --- | --- |
| Y | M | C | K | R | G | B |
| 0 | 0 | 0 | 0 | 255 | 255 | 255 |
| 0 | 0 | 0 | 25 | 230 | 230 | 230 |
| 0 | 0 | 0 | 255 | 0 | 0 | 0 |
| 0 | 0 | 25 | 0 | 230 | 255 | 255 |
| 0 | 255 | 255 | 0 | 0 | 0 | 255 |

Reversing the LUT and increasing the RGB values by one unit at a time we obtain:

| Inverse LUT | | | | | | |
| --- | --- | --- | --- | --- | --- | --- |
| R | G | B | Y | M | C | K |
| 0 | 0 | 0 | | | missing | |
| 0 | 0 | 1 | | | missing | |
| 0 | 0 | 2 | | | missing | |
| 0 | 0 | 255 | 0 | 255 | 255 | 0 |
| 0 | 1 | 0 | | | missing | |
| 0 | 1 | 1 | | | missing | | and so on, to produce a regularly distributed listing that has of course numerous voids, since while the original YMCK values were regularly distributed, it does not follow that the corresponding RGB values represent a regular distribution. Missing values are therefore estimated by interpolation. To estimate a missing point $P=P(Y_p,M_p,C_p,K_p,R,G,B_p)$ by one dimensional interpolation along the B coordinate between a point P1=P1(Y1,M1,C1,K1,R,G,B1) and P2=P2(Y2,M2, C2,K2,R,G,B2) we define F as the fraction F=(Bp-B1)/(B2-B1) and Q as Q=1-F; then:

$$Yp = F*Y2 + Q*Y1;$$

$$Mp = F*M2 + Q*M1;$$

$$Cp = F*C2 + Q*C1;$$

and $$Kp = F*K2 + Q*K1.$$

For instance, if upon sorting the inverse LUT along the B values, we find a missing value. We identify the last non-missing value. For instance, from the previous table we obtain:

$$P1=(0, 0, 230; 25, 255, 255, 0)$$

and the next non missing value:

$$P2=(0, 0, 255; 0, 255, 255, 0)$$

Then P=P( R, G, Bp; Yp, Mp, Cp, Kp)=(0, 0, 240; Yp, Mp, Cp, Kp) F=(240−230)/(255−230)=0.4 and Q=1−0.4= 0.6 resulting in:

Yp=15, Mp=255, Cp=255, Kp=0 giving the RGB to YMCK derived correspondence of:

| R | G | B | Y | M | C | K |
|---|---|---|---|---|---|---|
| 0 | 0 | 240 | 15 | 255 | 255 | 0 |

Referring back to FIG. 2, once the first, second and third LUTs are in place, we generate in a digital color sample value generator 70, which is preferably a computer, a new set of digital sample values representing a regular distribution of values in the device dependent color space, i.e., RGB values. These values are applied over line 72 to the input 28 of the primary LUT generator 13.

To create the primary LUT 12', the system operates as follows. Each of the regularly distributed digital color sample values from generator 70 is applied to the input 24 of the third color space converter 22 which contains the third approximate inverse LUT which converts regularly distributed device dependent color values to intermediate color space color values. In our example, RGB are converted to YMCK values and supplied to the combining means 30. At first, there is no correction factor to be applied and the YMCK values are reconverted through the second color space converter 36 back to a new set of R'G'B' values which are supplied to comparator 40 and compared with the input RGB values from generator 70. Any resulting error is sent to the correction factor generator 44 where it is tested to determine if it is a minimum error. A correction factor is outputted from the correction factor generator 44 and combined with the YMCK values in the combining means 30 giving a new Y'M'C'K' value which is again inputted to the second color space converter 36 to produce a second R"G"B" and a second error which is again tested to determine if it is a minimum, then used to produce a correction factor and so on.

When the error is found to be a minimum, the output of the combining means 30 is switched to the first color space converter 50 and the output, i.e., Y"M"C"K", used to produce corresponding output values in a device independent color space. These values are then used together in the compiler 54 with the input device dependent regularly distributed digital sample values to compile the primary LUT 12' which correlates regularly distributed device dependent color values to color values in a device independent color space. In the example used herein to illustrate this invention, the device dependent values have been RGB and the device independent space is Lab.

The input values in either the first 50 or the second 36 color space converter are usually not listed in the included LUT 96, 98. Interpolation is therefore often necessary to obtain an output value. The same is true for image values presented to the input of the color converter 11. Such interpolation is preferably multidimensional linear interpolation, particularly quad-linear interpolation since often a 4-D color space is used, such as YMCK. The preferred interpolation algorithm is as follows.

Let Fi be the fraction of the distance from a data point in an interval in the LUT to the length of the interval between that data point and the next consecutive data point along an "i" dimension where i=0,....,3 and Qi=1-Fi. Let tj (j=0,...., 15) be the 4-D fraction factors where:

| | | |
|---|---|---|
| t1=F0*F1*F2*F3 | t6=Q0*Q1*F1*F3 | t11=F0*F1*Q2*Q3 |
| t2=Q0*F1*F2*F3 | t7=Q0*F1*Q2*F3 | t12=F0*Q1*Q2*Q3 |
| t3=F0*Q1*F2*F3 | t8=Q0*F1*F2*Q3 | t13=Q0*F1*Q2*Q3 |
| t4=F0*F1*Q2*F3 | t9=F0*Q1*Q2*F3 | t14=Q0*Q1*F2*Q3 |
| t5=F0*F1*F2*Q3 | t10=F0*Q1*F2*Q3 | t15=Q0*Q1*Q2*F3 |
| | | t16=Q0*Q1*Q2*Q3 |

If Lab[i] (i=0,1,2) represent derived interpolated point values L,a,b, and Xj[i1][i2][i3][i4] (j=0,1,2) represent the LUT data point values in the device independent space for an input data point in the device dependent color space denoted by i1, i2, i3, and i4, then:

| |
|---|
| Lab[i]= t1*Xi [i1+1] [i2+1] [i3+1] [i4+1] + |
| t2*Xi [i1] [i2+1] [i3+1] [i4+ 1] + |
| t3*Xi [i1+ 1] [i2] [i3+ 1] [i4+1] + |
| t4*Xi [i1+1] [i2+1] [i3] [i4+1] + |
| t5*Xi [i1+1] [i2+1] [i3+1] [i4] + |
| t6*Xi [i1] [i2] [i3+1] [i4+1] + |
| t7*Xi [i1] [i2+1] [i3] [i4+1] + |
| t8*Xi [i1] [i2+1] [i3+1] [i4] + |
| t9*Xi [i1+1] [i2] [i3] [i4+1] + |
| t10*Xi [i1+1] [i2] [i3+1] [i4] + |
| t11*Xi [i1+1] [i2+1] [i3] [i4] + |
| t12*Xi [i1+1] [i2] [i3] [i4] + |
| t13*Xi [i1] [i2+1] [i3] [i4] + |
| t14*Xi [i1] [i2] [i3+1] [i4] + |
| t15*Xi [i1] [i2] [i3] [i4+1] + |
| t16*Xi [i1] [i2] [i3] [i4] . |

In its preferred version, the apparatus and associated method of this invention uses in the circuitry and process embodied by the combining means 30, the second color space converter 36, the determining means 45, the comparator 40 and the correction factor generator 44, an optimization algorithm and an error correction algorithm.

What is desired is to determine those correction factors that when added to the intermediate space color values will indeed result in a truly minimum error in the comparator 40. What one wants to avoid is obtaining a correction factor which only gives a minimum without determining whether this is indeed the best minimum rather than a localized minimum.

It is very difficult to predict correct intermediate input color values using direct backward interpolation because the intermediate input values as they appear at the input of the second converter 36 are randomly distributed. It is an even more difficult task to make the prediction when a four dimension color space, such as YMCK, is used because the three to four conversion is a non-unique mapping process because the value for K is not independent of the other three.

Figure 7:
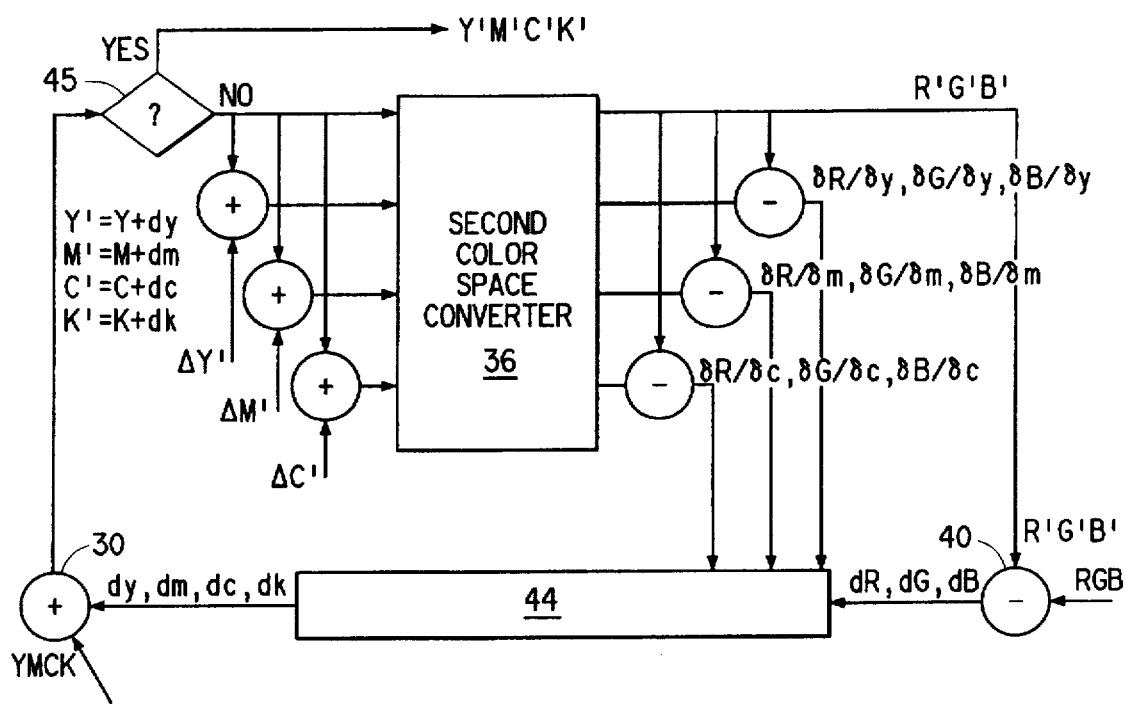
FIG. 7 is a schematic representation of an optimization process for generating correction factors.

FIG. 7 illustrates a preferred optimization process. A digital color sample (CYMK) is input to the second converter 36. The converter 36 outputs corresponding RGB values. By adding a variation Delta Y' to Y, Delta M' to M, and Delta C' to C, in turns, while keeping K constant, an estimate of the partial derivatives of output coordinates in output color space with respect to input coordinates in input color space are obtained from the input variation and the corresponding output variation predicted by the converter 36 giving the partial derivative of "R" with respect to "y" the partial derivative of "G" with respect to "y" and so on to the partial derivative of "B" with respect to "c".

The errors dR, dB and dG are obtained by comparing the converter output values R'G'B' to the sample input values RGB. The correction generator 44 solves the equations:

$$(\partial B/\partial y)dG - (\partial G/\partial y)dB =$$

$$[(\partial B/\partial y)(\partial G/\partial m) - (\partial G/\partial y)(\partial B/\partial m)]dm +$$

$$[(\partial B/\partial y)(\partial G/\partial c) - (\partial G/\partial y)(\partial B/\partial c)]dc$$

$$(\partial G/\partial y)dR - (\partial R/\partial y)dG =$$

$$[(\partial G/\partial y)(\partial R/\partial m) - (\partial R/\partial y)(\partial G/\partial m)]dm +$$

$$[(\partial G/\partial y)(\partial R/\partial c) - (\partial R/\partial y)(\partial G/\partial c)]dc$$

$$dR = (\partial R/\partial y)dy + (\partial R/\partial m)dm + (\partial R/\partial c)dc$$

The output from the correction factor generator 44 is combined with the YMCK signal and tested to determine the absence of a local minimum, i.e., whether this is indeed the true minimum. If so found, then the combining means output is applied to the first color space converter 50 as discussed above.

To test for the local minimum, we examine the error at the output of the comparator 40. If this error approaches 0 or a preset acceptable limit close to 0, after the iterative correction process has completed its course, the true minimum has been found. If however the error remains significant, we replace at the input of the second generator 44 the intermediate color values (Yn,Mn,Cn,Kn) from the output of the third converter 22 which values correspond to a set of input sample values (Rn,Gn,Bn) with the corrected intermediate values (Y'n−1, M'n−1, C'n−1, K'n−1) which were determined optimum in an immediately preceding cycle in which a previous set of device dependent color sample values (Rn−1, Gn−1, Bn−1) were used.

The resulting error, after comparing the output of the second converter 36 with the current input sample values and after applying optimization, is determined. If this error now approaches 0 then the new corrected intermediate values are accepted and applied to the first converter 50, and the earlier minimum is identified as a local minimum. If the error again does not approach 0, it is an indication that the color gamut in the one color space exceeds the color gamut in the other, in which case, if desired, particularly if the first space is a device independent space containing a plurality of color values originally produced using a scanner, and the second device dependent space is that of a color printer, one should consider mapping the colors in the scanner space to the colors in the printer space.

Figure 6:
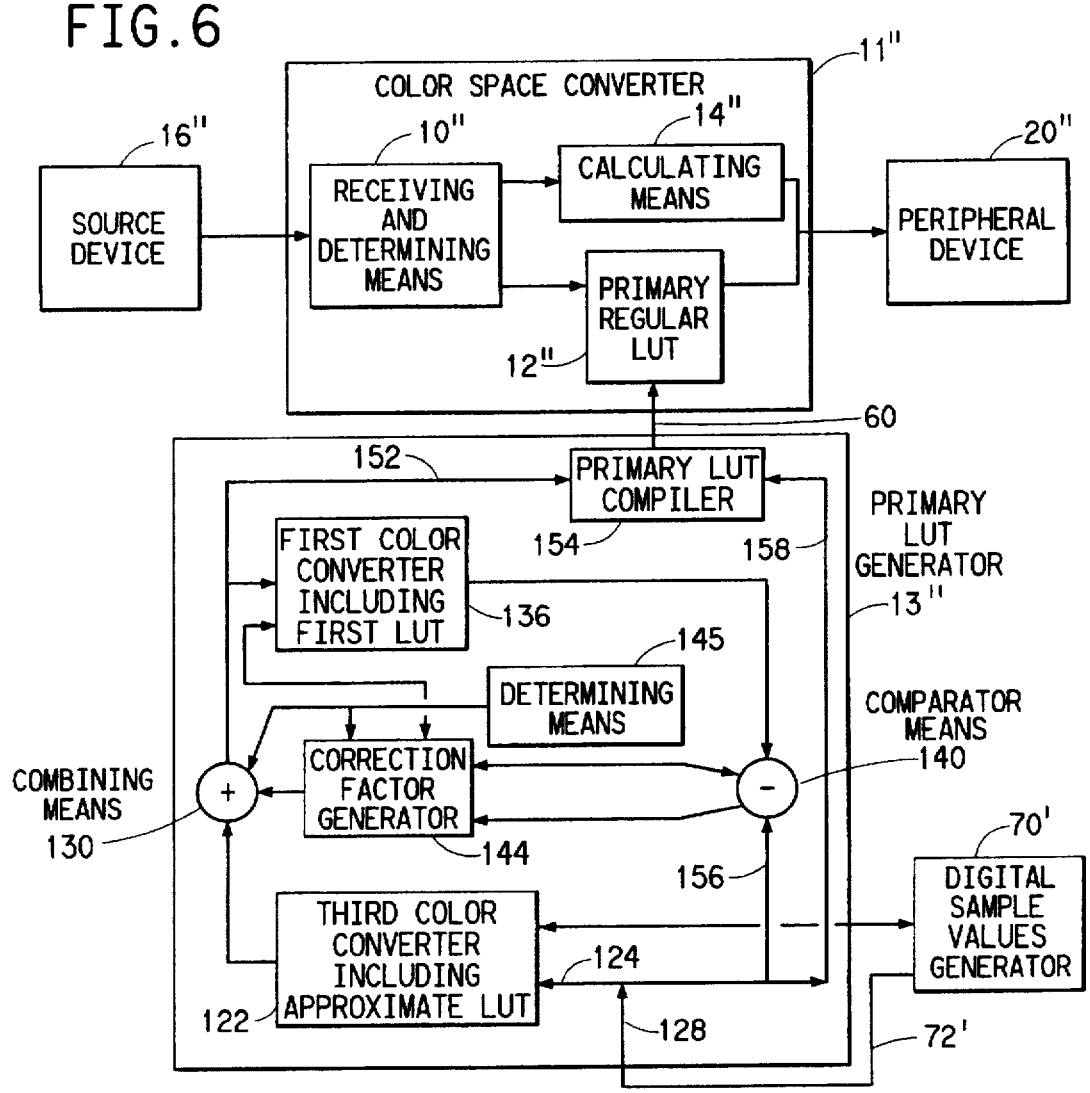
FIG. 6 is a schematic representation of an apparatus for implementing the present invention showing means associated with the color space converter for generating the primary LUT in the case where the conversion is from a device independent color space to a device dependent one.

FIG. 6 shows a somewhat different embodiment useful in cases where the first color space is a device independent color space, such as Lab, Luv, etc. In this case, the primary LUT 12' is developed in a simpler manner than before, using only two color converters, rather than three.

As shown in FIG. 6, this apparatus differs from that of FIG. 2 in that it comprises a primary LUT generator 13" which includes a third converter 122 comprising an approximate LUT correlating input device independent values, such as Lab, to device dependent color space values, such as YMCK. The output of this third converter 122 is directed to a combining means 130 which combines the output of the third converter 122 with a correction factor signal from a correction factor signal generator 144. The combined output is then applied to a first color converter 136 correlating device dependent color space values to device independent color space values. This color converter 136 as the previously discussed color converters also comprises a LUT correlating a list of regularly distributed device dependent color space values to device independent color values.

The LUT in the converter 136 is constructed by using a printing device of the type using input color data in said device dependent color space to produce an image. This may be a peripheral device 20". A set of regularly distributed color values in said device dependent space are generated with a computer not shown in any illustration but in similar manner as was done for the color patches discussed above, and printed to form another set of color patches; this other set of printed color patches is then measured with an instrument, typically either a spectrophotometer or a calorimeter, which gives an output in the desired device independent color space.

The LUT in the color converter 136 is also used to create the approximate LUT in converter 122 for correlating device independent values to device dependent values in the same manner as described above for the generation of inverse LUTs.

The apparatus further includes comparator means 140 for receiving the output of the first color converter 136 and for comparing this output to a set of regularly distributed digital sample input device independent color values supplied from a digital sample color generator 70'.

The digital sample color generator 70' supplies the digital values to a receiving means 128 in the primary LUT generator 13" via line 72'. The receiving means 128 applies the input signal in addition to an input 124 of converter 122, to comparator 140 over line 156 and to a primary LUT compiler 154 for compiling the primary LUT 12".

Determining means 145 again are used to determine when the output of combining means 130 are optimum and to use this optimum corrected output in compiler 154 to generate the primary LUT 12" which in this embodiment correlates a set of regularly distributed color values in a device independent color space to color values in a device dependent color space.

The color space converter 11" comprises a receiving means 10" for receiving an input signal representative of a color value in a device independent color space and for determining if such value is listed in the primary LUT 12". If it is listed, an output giving the corresponding device dependent value from the LUT 12" is supplied to the peripheral device 20". If the value is not listed in the LUT 12", the value is supplied to the interpolator or calculating means 14" where there is calculated by linear interpolation as described herein above a corresponding value in the device dependent space and this value is supplied to the peripheral device 20".

Figure 8:
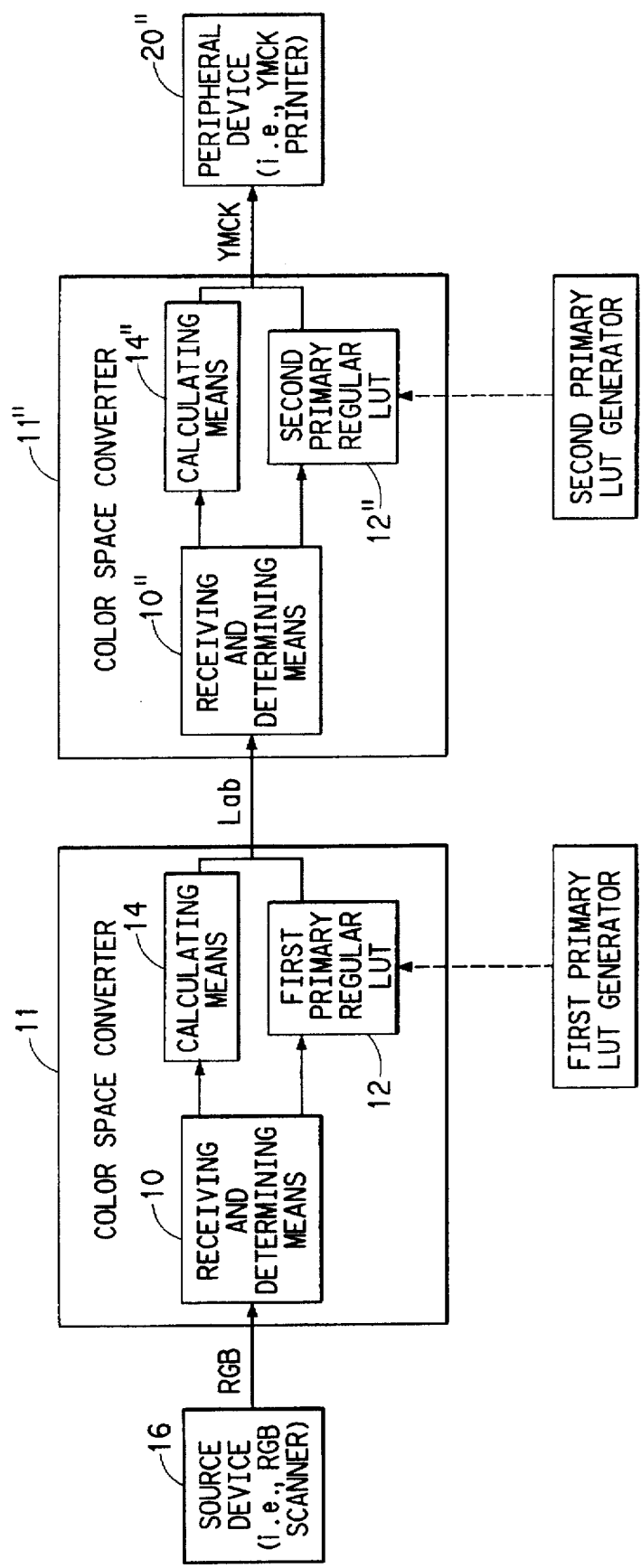
FIG. 8 is a schematic representation of an embodiment of the present invention useful for converting color values from one device dependent color space to another device dependent color space.

Referring now to the embodiment shown in FIG. 8, this invention may be advantageously used to connect the output of a first imaging device 16, such as a scanner, to the input of a second device 20", such as a printer, and still obtain a displayed image having color accurately matching that of the input image. This is particularly useful in cases where the first device 16, i.e., the scanner, has an output in a first color space defined by three vectors or components, i.e., Red, Green and Blue, (RGB), and the second device 20", i.e., the printer, operates in a color environment where color is defined in terms of four vectors or components, such as Yellow, Magenta, Cyan and Black (YMCK).

As shown in FIG. 8, the output of the first input device 16 is directed to the color converter 11. This color converter 11 is the same color converter shown in FIG. 1 and hereinabove described. Its output which is a plurality of color values in a device independent color space, such as Lab, is then inputted to the second color converter 11" which is the same as the color converter shown in FIG. 6 and also described earlier in this specification. As shown in FIG. 8, there can be associated with the color converters 11 and 11" shown, first and second primary LUT generators 13 and 13", both of which have also been described above in conjunction with FIGS. 2 and 6. The LUTs 12 of course can be precalculated using the LUT generators shown independently of the color converters 11 and 11", and stored in the color converters 11 and 11".

The operation of this embodiment is simply a serial conversion of the first plurality of values in a first, device dependent color space to a plurality of values in a device independent color space to a second plurality of color image values in a second device dependent color space. The two device dependent color spaces are different. Each step of the conversion is the same as described hereinabove in conjunction with the operation of the embodiments of FIGS. 1, 2, and 6.

Once the relationship between the first device independent and first and second device dependent values has been determined, that is once the first and the second primary LUT have been constructed, then a third LUT correlating directly the first input device dependent values to the second device dependent input values can also be constructed, providing a third primary LUT, which is a direct transform LUT for transforming values in the first device dependent space to values in the second device dependent space.

Figure 9:
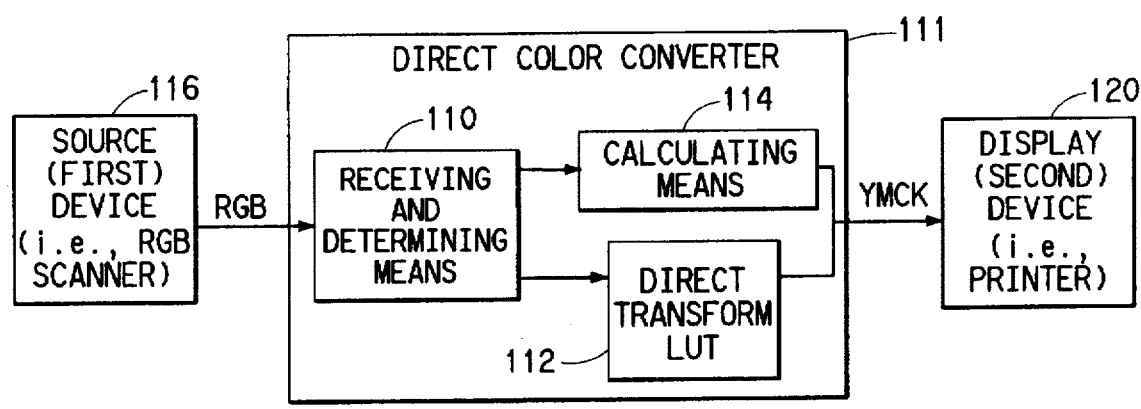
FIG. 9 is yet another schematic representation of an embodiment of the present invention employing a direct transform LUT.

FIG. 9 shows in schematic representation an arrangement for using the direct transform LUT, wherein output values from a first device, such as a scanner 116, are directed to a direct color converter 111 operating identically or substantially as the color converter of FIG. 1. A receiving and determining means 110 receives the incoming values and tests to determine if there are corresponding values in the direct transform LUT 112. If there are any exact values then it outputs a corresponding value in the color space of the peripheral device, i.e., a display device, such as a printer 120. If not, an interpolation is performed in a calculating means 114 which typically uses trilinear or quadrilinear interpolation to estimate a corresponding output value from the nearest input values found in the LUT.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A method for matching colors, comprising:

I) converting a first plurality of color image values from a first color space to a second plurality of color values in a second color space, wherein the first color space is a device dependent color space and the second color space is a device independent color space, by:

generating a primary regular conversion LUT correlating preselected regularly distributed color values in said first color space to color values in said second color space by:

1) generating a predetermined regular set of intermediate values representing a set of color patches;
2) printing said set of color patches;
3) measuring each of said printed patches and generating for each of said printed patches color values in said independent color space;
4) producing a first color space converter comprising a first LUT cross-referencing the predetermined regular set of intermediate color values representing the set of color patches, and the measured color values in said device independent color space representing the printed set of color patches, and a first interpolation algorithm for calculating Intermediate values not represented by any printed patches to color values in said device independent color space;
5) reading said printed set of color patches with a device of the type which produces color values in the device dependent color space, and producing for each of said printed patches device dependent color values in said device dependent color space;
6) generating a second color space converter comprising a second LUT cross-referencing the predetermined regular set of Intermediate values representing the set of color patches and color values in the device dependent color space, and a second interpolation algorithm for calculating Intermediate values not represented by any printed patches to the device dependent color values;
7) generating a third color space converter comprising a third LUT approximately cross-referencing the device dependent values and the Intermediate values;
8) generating a set of predetermined, regularly distributed, digital device dependent sample color values;
9) applying the third color space converter to said sample color values to obtain a corresponding set of sample Intermediate values;
10) applying the second color space converter to the sample Intermediate values to obtain a new set of device dependent sample color values corresponding to the digital device dependent sample color values;
11) comparing said regularly distributed device dependent digital sample color values and said new set of device dependent sample color values to obtain an error signal and using this error signal to derive a correction factor;
12) combining the correction factor with the output of the third color space converter to obtain a corrected output and again applying the second color space converter to the resulting corrected output of the third color space converter;
13) repeating steps 11) and 12) until the error signal is a minimum below a preset acceptable limit close to 0;
14) applying the first color space converter to the corrected output to produce an output device independent value for each regular digital device dependent sample color value; and 15) creating the primary LUT correlating the device independent values from the output of the first color space converter and the set of predetermined, regularly distributed, digital device dependent sample color values;

inputting and comparing randomly distributed image color values in said first color space to the values in said primary LUT; and (a) if there is a regularly distributed color value in the primary LUT corresponding to the random color value, outputting a corresponding value in said second color space; and (b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) using the outputted values from steps (a) and (b) to produce an image on a peripheral device.

2. Apparatus for converting a first plurality of color image values from a first color space to a second plurality of color values in a second color space, said first color space being a device dependent color space and said second color space being a device independent color space, comprising:

means for generating a primary regular LUT comprising a list of conversion values for a predetermined regular distribution of sample color values in said first color space for converting said sample color values to color values in said second color space, the generating means comprising:

a third color space converter having an input and an output, for converting sample color values in said device dependent color space to Intermediate values;

an input means connected to the third color space converter input for inputting to the third color space converter a set of regularly distributed sample color values in said device dependent color space;

a signal combining means for combining the output of the third color space converter and a correction signal to produce a corrected output, and for applying the corrected output to a second color space converter for converting Intermediate input color values to color values in said device dependent color space, and to a first color space converter for converting Intermediate input color values to color values in said device independent color space;

a comparator connected to an output of the second color space converter and to the input means for comparing the output signal of the second color space converter to the corresponding sample color values in said image dependent color space, and for producing an error signal, the comparator having an output for supplying the error signal to a correction signal generator for generating the correction signal;

means for determining when the error signal is a minimum below a preset acceptable limit close to 0 and for applying the corrected output from the combining means to the first color space convertor for converting said corrected signal to a signal representing corresponding color values in said device independent color space for each of the input sample color values, said first color space converter including an output means; and means for receiving said output color values in said independent color space corresponding to said input sample color values and for generating the primary LUT;

means for receiving a first plurality of color image values from a source device and for:

(a) determining for each of said first plurality of color image values whether there is a conversion value listed in said primary LUT and for outputting for each of said first plurality of color image values for which there is a conversion value listed in said primary LUT a corresponding output color value in said second color space; and (b) determining for each of said first plurality of color image values for which there is no conversion value listed in said primary LUT a closest conversion value listed in said primary LUT and calculating by interpolation from this closest conversion value a corresponding output color value in said second color space; and means for supplying said corresponding output color values to a peripheral device.

3. The apparatus in accordance with claim 2, wherein the first color space converter comprises a first conversion LUT cross-referencing a predetermined regular set of Intermediate values representing a set of color patches and a corresponding set of color values in said device independent color space representing a printed set of the color patches, and a first interpolation algorithm for calculating Intermediate values not represented by any printed patches to color values in said device independent color space.

4. The apparatus in accordance with claim 3, further comprising:

means for generating the predetermined regular set of Intermediate values representing the set of color patches;

means for printing said set of patches; and means for measuring each of said printed patches and for generating for each of said printed patches corresponding color values in said device independent color space.

5. The apparatus in accordance with claim 3, wherein the second color space converter comprises:

a second LUT cross-referencing the predetermined regular set of Intermediate values representing the set of color patches and a set of color values in the device dependent space corresponding to the printed patches; and a second interpolation algorithm for calculating Intermediate values not represented by any printed patches to color values in the device dependent color space.

6. The apparatus in accordance with claim 5, further comprising means to generate the second LUT including scanner means for reading said printed set of color patches and for producing for each of said printed patches color values in the device dependent color space.

7. The apparatus in accordance with claim 4, wherein the third color space converter comprises a third inverse LUT approximately cross-referencing the color values in the device dependent color space and the Intermediate values.

8. The apparatus in accordance with claim 2, further comprising a computer programmed to receive an input comprising device dependent color image values and digital sample color values and to perform the functions of the first, second and third color converters, the function of the interpolating means, the primary LUT compiler function, the comparator function, and the combining means function, and to output to the peripheral device corresponding device independent color image values.

9. A method for matching colors, comprising:

I) converting a first plurality of color image values from a first color space to a second plurality of color values in a second color space, wherein the first color space is a device independent color space and the second color space is a device dependent color space, by:

generating a primary regular conversion LUT correlating preselected regularly distributed color values in said first color space to color values in said second color space by:

1) using a peripheral device to print a predetermined set of regularly distributed color patches using a regularly distributed set of device dependent color values;
2) measuring each of said printed patches and generating for each of said printed patches color values in said device independent color space;
3) using the measured values and the corresponding set of device dependent regularly distributed values to generate a first LUT correlating device dependent values to device independent values;
4) using the same measured device independent values and device dependent regularly distributed values to generate an approximate inverse LUT correlating device independent values to device dependent values;
5) generating a set of regularly distributed digital color sample values in the device independent color space and converting said color sample values to device dependent color values using the approximate inverse LUT;
6) combining the converted sample color values with correction factors to obtain corrected converted color values;
7) converting said corrected color values using a first color space converter which includes said first LUT correlating device dependent values to device independent values, to obtain an output;
8) comparing the output to the digital sample values input to obtain an error signal;
9) using the error signal to generate the correction factors;
10) repeating steps 6) through 9) until the error signal is a minimum below a preset acceptable limit close to 0 and
11) using the corrected values and the set of regularly distributed digital color sample values to create the regular primary LUT;

inputting and comparing randomly distributed image color values in said first color space to the values in said primary LUT; and (a) if there is a regularly distributed color value in the primary LUT corresponding to the random color value, outputting a corresponding value in said second color space; and
(b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) using the outputted values from steps (a) and (b) to produce an image on the peripheral device.

10. Apparatus for converting a first plurality of color image values from a first color space to a second plurality of color values in a second color space, said first color space being a device independent color space and said second color space being a device dependent color space, comprising:

means for generating a primary regular LUT comprising a list of conversion values for a predetermined regular distribution of sample color values in said first color space for converting said sample color values to color values in said second color space, the generating means comprising:

means for receiving said sample values;
means for applying said sample values to a third color space converter including a third inverse approximate LUT for converting device independent values to device dependent color values;
means connected to said third color space converter for combining an output of said third color space converter with correction factors and for applying an output of said combining means to a first color space converter which includes a first LUT correlating device dependent values to device independent values;
means connected to an output of said first color space converter for applying an output of said first color space converter to a comparator for comparing output values from the first color space converter to the input sample values and for obtaining an output error signal;
means for applying the input sample values to said comparator;
means for applying the error signal to a correction generator for outputting the correction factors; and
means for determining when the error signal is a minimum error signal below a preset acceptable limit close 0 and for applying the output of the combining means to a primary LUT compiler for compiling the primary LUT;

means for receiving a first plurality of color image values from a source device and for:

(a) determining for each of said first plurality of color image values whether there is a conversion value listed in said primary LUT and for outputting for each of said first plurality of color image values for which there is a conversion value listed in said primary LUT a corresponding output color value in said second color space; and
(b) determining for each of said first plurality of color image values for which there is no conversion value listed in said primary LUT a closest conversion value listed in said primary LUT and calculating by interpolation from this closest conversion value a corresponding output color value in said second color space; and means for supplying said corresponding output color values to a peripheral device.

11. A method for matching colors in an image received from a source device and displayed on a peripherial device, comprising:

I) converting a first plurality of color image values from a first color space to a second plurality of color values in a second color space, wherein the first color space is a device dependent color space and the second color space is a device independent color space, by:

generating a first primary regular conversion LUT correlating preselected regularly distributed color values in said first color space to color values in said second color space by:

1) generating a predetermined regular set of intermediate values representing a set of color patches;
2) printing said set of color patches;
3) measuring each of said printed patches and generating for each of said printed patches color values in said independent color space;

4) producing a first color space converter comprising a first LUT cross-referencing the predetermined regular set of intermediate color values representing the set of color patches, and the measured color values in said device independent color space representing the printed set of color patches, and a first interpolation algorithm for calculating Intermediate values not represented by any printed patches to color values in said device independent color space;

5) reading said printed set of color patches with a device of the type which produces color values in the device dependent color space, and producing for each of said printed patches device dependent color values in said device dependent color space;

6) generating a second color space converter comprising a second LUT cross-referencing the predetermined regular set of Intermediate values representing the set of color patches and color values in the device dependent color space, and a second interpolation algorithm for calculating Intermediate values not represented by any printed patches to the device dependent color values;

7) generating a third color space converter comprising a third LUT approximately cross-referencing the device dependent values and the Intermediate values;

8) generating a set of predetermined, regularly distributed, digital device dependent sample color values;

9) applying the third color space converter to said sample color values to obtain a corresponding set of sample Intermediate values;

10) applying the second color space converter to the sample Intermediate values to obtain a new set of device dependent sample color values corresponding to the digital device dependent sample color values;

11) comparing said regularly distributed device dependent digital sample color values and said new set of device dependent sample color values to obtain an error signal and using this error signal to derive a correction factor;

12) combining the correction factor with the output of the third color space converter to obtain a corrected output and again applying the second color space converter to the resulting corrected output of the third color space converter;

13) repeating steps 11) and 12) until the error signal is a minimum below a preset acceptable limit close to 0;

14) applying the first color space converter to the corrected output to produce an output device independent value for each regular digital device dependent sample color value; and 15) creating the primary LUT correlating the device independent values from the output of the first color space converter and the set of predetermined, regularly distributed, digital device dependent sample color values;

inputting and comparing randomly distributed image color values in said first color space from the source device to the values in said primary LUT; and (a) if there is a regularly distributed color value in the primary LUT corresponding to the random color value, outputting a corresponding value in said second color space; and (b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) converting the outputted values from steps (a) and (b) from the second color space to a third plurality of color values in a third color space, wherein the third color space is a device dependent color space, by:

generating a second primary regular conversion LUT correlating preselected regularly distributed color values in said second color space to color values in said third color space by:

1) using the peripheral device to print a predetermined set of regularly distributed color patches using a regularly distributed set of device dependent color values;

2) measuring each of said printed patches and generating for each of said printed patches color values in said device independent color space;

3) using the measured values and the corresponding set of device dependent regularly distributed values to generate a first LUT correlating device dependent values to device independent values;

4) using the same measured device independent values and device dependent regularly distributed values to generate an approximate inverse LUT correlating device independent values to device dependent values;

5) generating a set of regularly distributed digital color sample values in the device independent color space and converting said color sample values to device dependent color values using the approximate inverse LUT;

6) combining the converted sample color values with correction factors to obtain corrected converted color values;

7) converting said corrected color values using a first color space converter which includes said first LUT correlating device dependent values to device independent values, to obtain an output;

8) comparing the output to the digital sample values input to obtain an error signal;

9) using the error signal to generate the correction factors;

10) repeating steps II) 6) through II) 9) until the error signal is a minimum below a preset acceptable limit close to 0; and 11) using the corrected values and the set of regularly distributed digital color sample values to create the second regular primary LUT;

inputting and comparing the outputted values from steps (a) and (b) from the second color space to the values in said second primary LUT; and (i) if there is a regularly distributed color value in the second primary LUT corresponding to the outputted value, outputting a corresponding value in said third color space; and (ii) if there is no corresponding regularly distributed color value in said second primary LUT, selecting from said second primary LUT a closest regularly distributed color value to said outputted value and calculating therefrom a color value in said third color space, corresponding to said outputted value, and outputting said calculated value; and III) using the outputted values from steps (i) and (ii) to produce an image on the peripheral device.

12. Apparatus for converting a plurality of color values in a first device dependent, color space to a plurality of color values in a final device dependent, color space, comprising:

I) means for generating a first primary regular LUT comprising a list of conversion values for a predetermined regular distribution of sample color values in said first color space for converting said sample color values to color values in said second color space, the generating means comprising:
   a third color space converter having an input and an output, for converting sample color values in said device dependent color space to Intermediate values;
   an input means connected to the third color space converter input for inputting to the third color space converter a set of regularly distributed sample color values in said device dependent color space;
   a signal combining means for combining the output of the third color space converter and a correction signal to produce a corrected output, and for applying the corrected output to a second color space converter for converting Intermediate input color values to color values in said device dependent color space, and to a first color space converter for converting Intermediate input color values to color values in said device independent color space;
   a comparator connected to an output of the second color space converter and to the input means for comparing the output signal of the second color space converter to the corresponding sample color values in said image dependent color space, and for producing an error signal, the comparator having an output for supplying the error signal to a correction signal generator for generating the correction signal;
   means for determining when the error signal is a minimum below a preset acceptable limit close to 0 and for applying the corrected output from the combining means to the first color space convertor for converting said corrected signal to a signal representing corresponding color values in said device independent color space for each of the input sample color values, said first color space converter including an output means; and
   means for receiving said output color values in said independent color space corresponding to said input sample color values and for generating the primary LUT;

II) first means for receiving a first plurality of color image values from a source device and for:
   (a) determining for each of said first plurality of color image values whether there is a conversion value listed in said primary LUT and for outputting for each of said first plurality of color image values for which there is a conversion value listed in said primary LUT a corresponding output color value in said second color space; and
   (b) determining for each of said first plurality of color image values for which there is no conversion value listed in said primary LUT a closest conversion value listed in said primary LUT and calculating by interpolation from this closest conversion value a corresponding output color value in said second color space; and III) means for generating a second primary regular LUT comprising a list of conversion values for a predetermined regular distribution of sample color values in said second color space for converting said sample color values to color values in said final color space, the generating means comprising:
   means for receiving said sample values;
   means for applying said sample values to a third color space converter including a third inverse approximate LUT for converting device independent values to device dependent color values;
   means connected to said third color space converter for combining an output of said third color space converter with correction factors and for applying an output of said combining means to a first color space converter which includes a first LUT correlating device dependent values to device independent values;
   means connected to an output of said first color space converter for applying an output of said first color space converter to a comparator for comparing output values from the first color space converter to the input sample values and for obtaining an output error signal;
   means for applying the input sample values to said comparator;
   means for applying the error signal to a correction generator for outputting the correction factors; and
   means for determining when the error signal is a minimum error signal below a preset acceptable limit close to 0 and for applying the output of the combining means to a primary LUT compiler for compiling the second primary LUT;

IV) second means for receiving the outputted values in said second color space from the first receiving means and for:
   (i) determining for each of said outputted values in said second color space whether there is a conversion value listed in said second primary LUT and for outputting for each of said outputted values in said second color space for which there is a conversion value listed in said second primary LUT a corresponding output color value in said final color space; and
   (ii) determining for each of said outputted values in said second color space for which there is no conversion value listed in said second primary LUT a closest conversion value listed in said second primary LUT and calculating by interpolation from this closest conversion value a corresponding output color value in said final color space; and V) means for supplying said corresponding output color values in said final color space to a peripheral device.

13. A method for matching colors in an image received from a source device and displayed on a peripherial device, comprising:

I) converting a first plurality of color image values from a first color space to a second plurality of color values in a second color space, wherein the first color space is a device dependent color space and the second color space is a device independent color space, by:
   generating a first primary regular conversion LUT correlating preselected regularly distributed color values in said first color space to color values in said second color space by:
      1) generating a predetermined regular set of intermediate values representing a set of color patches;
      3) printing said set of color patches;
      3) measuring each of said printed patches and generating for each of said printed patches color values in said independent color space;

4) producing a first color space converter comprising a first LUT cross-referencing the predetermined regular set of intermediate color values representing the set of color patches, and the measured color values in said device independent color space representing the printed set of color patches, and a first interpolation algorithm for calculating Intermediate values not represented by any printed patches to color values in said device independent color space;

5) reading said printed set of color patches with a device of the type which produces color values in the device dependent color space, and producing for each of said printed patches device dependent color values in said device dependent color space;

6) generating a second color space converter comprising a second LUT cross-referencing the predetermined regular set of Intermediate values representing the set of color patches and color values in the device dependent color space, and a second interpolation algorithm for calculating Intermediate values not represented by any printed patches to the device dependent color values;

7) generating a third color space converter comprising a third LUT approximately cross-referencing the device dependent values and the Intermediate values;

8) generating a set of predetermined, regularly distributed, digital device dependent sample color values;

9) applying the third color space converter to said sample color values to obtain a corresponding set of sample Intermediate values;

10) applying the second color space converter to the sample Intermediate values to obtain a new set of device dependent sample color values corresponding to the digital device dependent sample color values;

11) comparing said regularly distributed device dependent digital sample color values and said new set of device dependent sample color values to obtain an error signal and using this error signal to derive a correction factor;

12) combining the correction factor with the output of the third color space converter to obtain a corrected output and again applying the second color space converter to the resulting corrected output of the third color space converter;

13) repeating steps 11) and 12) until the error signal is a minimum below a preset acceptable limit close to 0;

14) applying the first color space converter to the corrected output to produce an output device independent value for each regular digital device dependent sample color value; and 15) creating the primary LUT correlating the device independent values from the output of the first color space converter and the set of predetermined, regularly distributed, digital device dependent sample color values;

inputting and comparing randomly distributed image color values in said first color space from the source device to the values in said primary LUT; and (a) if there is a regularly distributed color value in the primary LUT corresponding to the random color value, outputting a corresponding value in said second color space; and (b) if there is no corresponding regularly distributed color value in said primary LUT, selecting from said primary LUT a closest regularly distributed color value to said randomly distributed color value and calculating therefrom a color value in said second color space, corresponding to said inputted random color value, and outputting said calculated value; and II) converting the outputted values from steps (a) and (b) from the second color space to a third plurality of color values in a third color space, wherein the third color space is a device dependent color space, by:

generating a second primary regular conversion LUT correlating preselected regularly distributed color values in said second color space to color values in said third color space by:

1) using the peripheral device to print a predetermined set of regularly distributed color patches using a regularly distributed set of device dependent color values;

2) measuring each of said printed patches and generating for each of said printed patches color values in said device independent color space;

3) using the measured values and the corresponding set of device dependent regularly distributed values to generate a first LUT correlating device dependent values to device independent values;

4) using the same measured device independent values and device dependent regularly distributed values to generate an approximate inverse LUT correlating device independent values to device dependent values;

5) generating a set of regularly distributed digital color sample values in the device independent color space and converting said color sample values to device dependent color values using the approximate inverse LUT;

6) combining the converted sample color values with correction factors to obtain corrected converted color values;

7) converting said corrected color values using a first color space converter which includes said first LUT correlating device dependent values to device independent values, to obtain an output;

8) comparing the output to the digital sample values input to obtain an error signal;

9) using the error signal to generate the correction factors;

10) repeating steps II) 6) through II) 9) until the error signal is a minimum below a preset acceptable limit close to 0; and 11) using the corrected values and the set of regularly distributed digital color sample values to create the second regular primary LUT;

inputting and comparing the outputted values from steps (a) and (b) from the second color space to the values in said second primary LUT; and (i) if there is a regularly distributed color value in the second primary LUT corresponding to the outputted value, outputting a corresponding value in said third color space; and (ii) if there is no corresponding regularly distributed color value in said second primary LUT, selecting from said second primary LUT a closest regularly distributed color value to said outputted value and calculating therefrom a color value in said third color space, corresponding to said outputted value, and outputting said calculated value; and III) using the first and second primary LUTs to create a direct transform LUT correlating first and third device dependent color values;

IV) inputting and comparing randomly distributed image color values in said first color space from the source device to the values in said direct transform LUT; and (a) if there is a regularly distributed color value in the direct transform LUT corresponding to the random color value, outputting a corresponding value in said third color space; and (b) if there is no corresponding regularly distributed color value in said direct transform LUT, selecting from said direct transform LUT a closest regularly distributed color value to said randomly distributed color value and calculating therefrom a color value in said third color space, corresponding to said inputted random color value, and outputting said calculated value; and V) using the outputted values from steps IV) (a) and IV) (b) to produce an image on the peripheral device.

14. Apparatus for converting a plurality of color values in a first device dependent, color space to a plurality of color values in a final device dependent, color space, comprising:

I) means for generating a first primary regular LUT comprising a list of conversion values for a predetermined regular distribution of sample color values in said first color space for converting said sample color values to color values in a second device independent color space, the generating means comprising:

a third color space converter having an input and an output, for converting sample color values in said device dependent color space to Intermediate values;

an input means connected to the third color space converter input for inputting to the third color space converter a set of regularly distributed sample color values in said device dependent color space;

a signal combining means for combining the output of the third color space converter and a correction signal to produce a corrected output, and for applying the corrected output to a second color space converter for converting Intermediate input color values to color values in said device dependent color space, and to a first color space converter for converting Intermediate input color values to color values in said device independent color space;

a comparator connected to an output of the second color space converter and to the input means for comparing the output signal of the second color space converter to the corresponding sample color values in said image dependent color space, and for producing an error signal, the comparator having an output for supplying the error signal to a correction signal generator for generating the correction signal;

means for determining when the error signal is a minimum below a preset acceptable limit close to 0 and for applying the corrected output from the combining means to the first color space convertor for converting said corrected signal to a signal representing corresponding color values in said device independent color space for each of the input sample color values, said first color space converter including an output means; and means for receiving said output color values in said independent color space corresponding to said input sample color values and for generating the primary LUT;

II) first means for receiving a first plurality of color image values from a source device and for:

(a) determining for each of said first plurality of color image values whether there is a conversion value listed in said primary LUT and for outputting for each of said first plurality of color image values for which there is a conversion value listed in said primary LUT a corresponding output color value in said second color space; and (b) determining for each of said first plurality of color image values for which there is no conversion value listed in said primary LUT a closest conversion value listed in said primary LUT and calculating by interpolation from this closest conversion value a corresponding output color value in said second color space; and III) means for generating a second primary regular LUT comprising a list of conversion values for a predetermined regular distribution of sample color values in said second color space for converting said sample color values to color values in said final color space, the generating means comprising:

means for receiving said sample values;

means for applying said sample values to a third color space converter including a third inverse approximate LUT for converting device independent values to device dependent color values;

means connected to said third color space converter for combining an output of said third color space converter with correction factors and for applying an output of said combining means to a first color space converter which includes a first LUT correlating device dependent values to device independent values;

means connected to an output of said first color space converter for applying an output of said first color space converter to a comparator for comparing output values from the first color space converter to the input sample values and for obtaining an output error signal;

means for applying the input sample values to said comparator;

means for applying the error signal to a correction generator for outputting the correction factors; and means for determining when the error signal is a minimum error signal below a preset acceptable limit close to 0 and for applying the output of the combining means to a primary LUT compiler for compiling the second primary LUT;

IV) second means for receiving the outputted values in said second color space from the first receiving means and for:

(i) determining for each of said outputted values in said second color space whether there is a conversion value listed in said second primary LUT and for outputting for each of said outputted values in said second color space for which there is a conversion value listed in said second primary LUT a corresponding output color value in said final color space; and (ii) determining for each of said outputted values in said second color space for which there is no conversion value listed in said second primary LUT a closest conversion value listed in said second primary LUT and calculating by interpolation from this closest conversion value a corresponding output color value in said final color space; and V) means for directly correlating first and final device dependent color values created from using the first and second primary LUTs;

VI) third means for receiving a plurality of color image values from the source device, comparing the plurality of color image values in said first color space from the source device to the values in said direct transform LUT, and for:
   (a) determining if there is a regularly distributed color value in the direct transform LUT corresponding to the random color value, outputting a corresponding value in said final color space; and
   (b) determining if there is no corresponding regularly distributed color value in said direct transform LUT, selecting from said direct transform LUT, a closest regularly distributed color value to said randomly distributed color value and calculating therefrom a color value in said final color space, corresponding to said inputted random color value, and outputting said calculated value; and VII) means for supplying said corresponding output color values from the inputting and comparing means in said final color space to a peripheral device.

* * * * *